United States Patent [19]
Emter

[11] 3,733,094
[45] May 15, 1973

[54] FASTENER DEVICE FOR SAW ARBOR
[76] Inventor: James J. Emter, 1204 N.W. 53rd Street, Vancouver, Wash. 98663
[22] Filed: Mar. 29, 1971
[21] Appl. No.: 129,047

[52] U.S. Cl. ............... 287/53 R, 83/664, 143/155 R
[51] Int. Cl. ............................. F16d 1/06, B27b 5/32
[58] Field of Search ..................... 83/665, 664, 663, 83/698; 143/155 R, 38 R; 287/53 R, 52.07

[56] References Cited

UNITED STATES PATENTS 2,888,076  5/1959  Lanstrom ........................... 83/665
3,618,994  11/1971  Gepfert ............................ 287/53 R

*Primary Examiner*—Gil Weidenfeld
*Attorney*—Daniel P. Chernoff and Jacob E. Vilhauer, Jr.

[57] ABSTRACT

A bind-free, bidirectional non-releasing fastener, for an arbor shaft carrying an assembly of circular saw blades and spacers, for securing the blade and spacer assembly against axial movement in operation yet permitting ready unfastening and refastening for repair, replacement and resetting of the saws on the arbor. The fastener comprises two disc portions, both of annular configuration and fitting loosely over an end of the arbor shaft, cooperating with a pin passing through a diametric hole formed in the arbor shaft. The first of the annular discs contains a pair of aligned radial grooves on the outside face thereof for receiving and locking the projecting ends of the pin. This first member is also provided with a plurality of adjustable threaded bolts extending transversely through the member parallel to the axis of the arbor. In the fastened mode the second disc member bears with one face against the terminal end of the blade and spacer assembly and its other face is held in spaced rigid relationship to the axially-pinned first disc member by means of the threaded bolts. To release the fastener device, the threaded bolts are loosened by turning in the reverse direction to remove the bearing pressure on the second disc member and permit it to be rotated relative to the first disc member until the bolts are opposed to depressions formed in the face of the second member. This rotational position permits the first disc member to be moved closer inward toward the second disc member, thus freeing the pin from the grooves securing it against movement, and thereby allowing the pin to be withdrawn from the arbor shaft. Thereupon the first and second disc members can then be slid axially off of the arbor, permitting the assembly of saw blades and spacers to be slid off the arbor.

8 Claims, 4 Drawing Figures

PATENTED MAY 15 1973 3,733,094
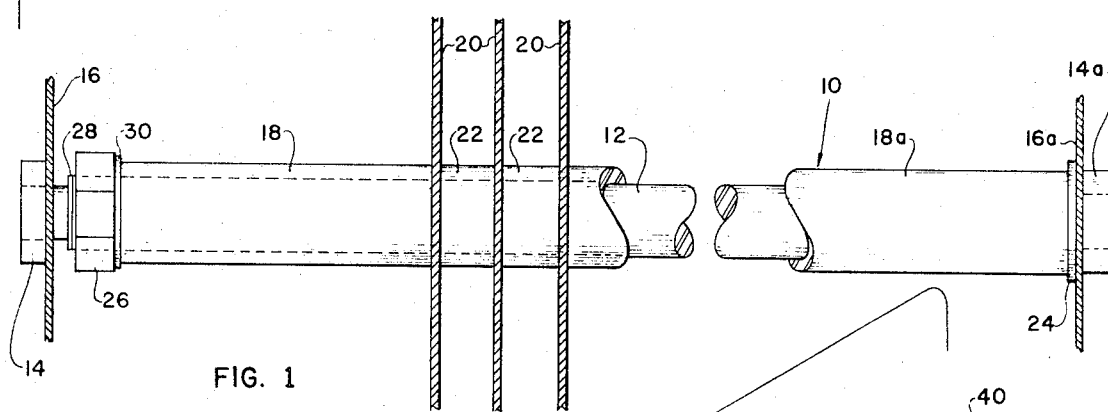
FIG. 1 — PRIOR ART
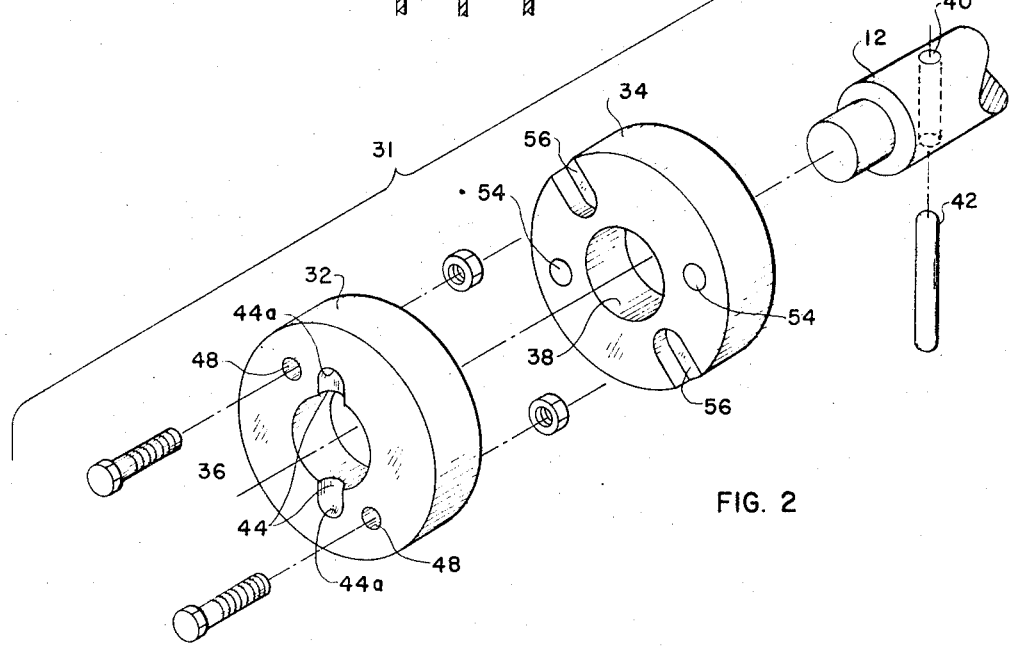
FIG. 2
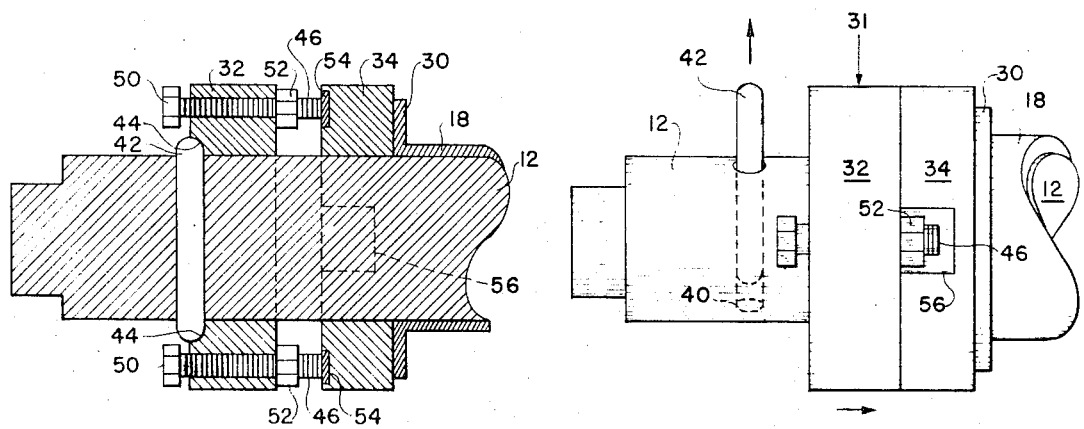
FIG. 3          FIG. 4

3,733,094

FASTENER DEVICE FOR SAW ARBOR

BACKGROUND OF THE INVENTION

This invention relates to improvements in a fastener for holding the spaced blades of a saw arbor securely in position for cutting boards or studs of predetermined width. More specifically, the fastener holds the blades and their associated spacer assembly tightly against axial movement on the arbor during operation yet permits ready unfastening for adjusting, dismantling and servicing of the saws and spacer assembly.

In arbor fastening devices of the type known to the art, rotary saw blades and their associated tubular spacer assembly are mounted on the arbor shaft and held firmly against axial movement between a shoulder on one end of the shaft and a large nut tightened onto a threaded portion of the shaft at its other end. However, the conventional nut-type fastener does not maintain its original torque during operation of the high-speed rotary arbor. For example, if the arbor rotates in the same direction as that for tightening the nut, the nut tends to loosen, relieving pressure on the spacer assembly and allowing some axial displacement of the saw blades and consequent unevenness and loss of uniformity in the width of the boards cut. Moreover undue vibration and consequent harm to both saw blades and arbor shaft can result from such loosening. On the other hand, if the arbor rotates in a direction opposite that for tightening the nut, the nut tends to become even tighter, causing warping of the spacer assembly from the excessive pressure exerted by the nut. On frequent occasion freezing or binding of the nut to the arbor shaft also results so that it can be released only with great difficulty, sometimes requiring the cutting off of the fastener. Either of these events creates troublesome problems and added expense for the sawmill operator. Accordingly there is a real need in the sawmill industry for a saw arbor fastening device which is bind-free and non-releasing during operation, regardless of the direction of rotation of the arbor, and yet permits ready unfastening and refastening for repair, replacement or resetting of the saw blades on the arbor.

SUMMARY OF THE PRESENT INVENTION

The present invention is directed to a saw arbor fastener of the general type described comprising two annular discs fitting loosely over the end of the arbor shaft with the outer surface of the first or outside disc abutting a pin inserted through a diametric hole formed in the arbor shaft, and the outer surface of the second or inside disc abutting one end of the saw spacer assembly. The two discs are slidably mounted on the arbor shaft and are separated by adjustable tightening means for spreading the discs forceably apart between the saw spacer assembly and the axially-fixed pin so as to restrain the spacer assembly in place. The adjustable tightening means comprises a plurality of threaded bolts protruding perpendicularly from the inner surface of the first disc with their ends bearing against the inner surface of the second disc, each bolt having a central axis parallel to the axis of rotation of the arbor shaft and located a spaced distance radially therefrom.

The outer surface of the first disc contains a pair of aligned radial grooves for receiving and locking the projecting ends of the pin to prevent its dropping out of the shaft during operation. The inner surface of the second disc contains respective bearing surfaces correspondingly spaced to seatingly engage the threaded tightening bolts, as well as a corresponding number and spaced arrangement of depressions formed in the disc and circularly offset from the bearing surfaces. Upon minimal loosening of the tightening bolts the second disc can be rotated relative to the first so that the depressions are brought into position opposite the respective bolts to permit the outside disc to be moved inwardly toward the inside disc, thus freeing the pin from its locking grooves and allowing the discs to be slid off the shaft for quick disassembly of the fastener device.

The novel constructional features of the arbor fastener of the present invention provide it with several important operational advantages. First, the provision of means for mounting threaded tightening bolts with their central axes spaced radially apart from, rather than coincident with, the axis of rotation of the arbor shaft ensures that the high-speed rotation of the arbor shaft will neither tighten nor loosen the arbor fastener during operation, but will instead allow it to maintain a constant, initially set pressure against the spacer and saw blade assembly. The fact that the fastener of the present invention neither tightens up nor loosens during operation permits the rotation of the arbor to be reversed as desired, since problems encountered with prior art nut-type fasteners are eliminated.

Second, the provision of an arbor fastener slidably rather than threadably mounted on the arbor shaft, coupled with means for completely releasing the fastener after only a slight loosening of the tightening bolts followed by a half-turn or less rotation of one of the discs with respect to the other, ensures rapid and convenient removal of the fastener assembly when necessary to repair, replace or reset the saw blades. Moreover, refastening of the arbor fastener is equally facile since it is effected by a simple reversal of the releasing steps. The inordinate time and effort required, as is the case with the prior nut-type fastener, in completely threading and unthreading a large fastener nut onto the arbor shaft, is avoided.

It is therefore a principal objective of the present invention to provide a new and improved fastener device for holding the blades and spacer assembly of a saw arbor against axial movement during operation by maintaining a constant, preset holding pressure against the blades and spacer assembly irrespective of the speed or direction of rotation of the arbor.

It is a further objective of the present invention to provide a saw arbor fastener device which can be rapidly and conveniently dismantled for repair, replacement or resetting of the saw blades, and can be subsequently refastened with equal speed and convenience.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is an extended side elevation view of a saw arbor showing its spacer assembly, saw blades and a prior art nut-type form of arbor fastener.

FIG. 2 is an exploded perspective view of the arbor fastener of the present invention.

FIG. 3 is a partially sectional, side elevation view showing the arbor fastener of the present invention in its tightened position.

FIG. 4 is a side elevation view showing the arbor fastener of the present invention in its released position preparatory to its removal from the arbor shaft.

DESCRIPTION OF THE PREFERRED EMBODIMENT

Referring initially to FIG. 1, the saw arbor assembly, designated generally as 10, comprises a conventional arbor shaft 12 rotatably mounted at each of its ends in bearings 14 and 14a respectively which are in turn mounted on supporting frame portions 16 and 16a respectively. Arbor shaft 12 is rotated at high speed by suitable drive motor means (not shown) connected at one of its ends. Encircling the arbor shaft at each of its two ends are respective tubular sleeves 18 and 18a. The sleeves are locked to the arbor shaft in conventional fashion by an elongated key which fits in an axial groove formed in the arbor and in a mating groove formed in each tube (not shown). Mounted between sleeves 18 and 18a on the arbor shaft are a plurality of circular saw blades 20, three of which are shown but which may in actual practice comprise a dozen or more such blades. The saw blades 20 are spaced from one another by tubular spacers 22 also keyed to the arbor shaft which, together with sleeve portions 18 and 18a, comprise the spacer assembly of the saw arbor. The respective tubular spacers 22 typically each have a projecting axial pin (not shown) which passes through a hole formed in the adjacent saw blade and fits inside a mating recess in the next adjacent spacer for pin-locking all of the spacers and interspersed blades together.

The saw blades and spacer assembly are secured on the arbor shaft 12 against axial movement by shoulder 24 at one end of shaft 12 which abuts sleeve 18a, and at the other end of shaft 12 by a fastener means such as the prior-art form of fastener nut 26 which screws onto a threaded portion 28 of the shaft and abuts against flange 30 of sleeve 18. By tightening nut 26 against sleeve 18 the entire saw blade and spacer assembly of the arbor may be squeezed tightly together, thus precisely locating saw blades 20 and rigidly holding them at predetermined spaced intervals corresponding to the width of the boards which are to be cut.

It periodically becomes necessary to dismantle the saw arbor assembly in order to replace worn or broken saw blades, or change the number, spacing or relative locations of the saw blades so as to obtain cuts of different widths. In order to dismantle the saw arbor, the prior-art type of fastener nut 26 depicted in FIG. 1 is loosened, preferably by using a large spanner wrench, and the end of the shaft adjacent fastener nut 26 is removed from its associated bearing 14. (In order to facilitate removal, frame 16 preferably constitutes a door member which can be swung away from arbor shaft 12, thereby separating the bearing from the shaft.) Thereafter, fastener nut 26 is unthreaded and slipped off the end of arbor 12, followed by those elements of the spacer assembly and saw blades which are to be replaced. To reassemble the saw arbor the preceding steps are repeated in reverse fashion and the fastener nut 26 is once more tightened down to secure the saw blades and spacer assembly against axial movement.

It should be recognized that the preceding description has been directed entirely to conventional apparatus known to the art. The new improved arbor fastener device of the present invention for fastening and holding the saw blades and spacer assembly, which is designed to overcome the disadvantages of the conventional nut-type arbor fastener, will now be described.

Referring now to FIG. 2, the novel arbor fastener of the present invention, designated generally as 31, comprises a first annular disc 32 and a second annular disc 34, each having a central circular opening 36 and 38 respectively for loose mounting on arbor shaft 12. The end of shaft 12 has no threaded portion similar to 28 when adapted for use with the present invention but instead has a hole 40 drilled diametrically through it adjacent the axial location where the fastener is to be mounted for receiving a loose-fitting pin 42.

When fastener 31 is in its installed position, as shown in FIG. 3, the pair of discs 32 and 34 are sandwiched between pin 42 and flange 30 of tubular sleeve 18 forming the end of the spacer and saw blade assembly. The outside face of disc 32, which is mounted on the outside of the shaft relative to disc 34, contains a pair of aligned radial grooves 44 each having an end wall 44a for receiving and locking the projecting ends of pin 42 to secure the pin against any possibility of working its way out of hole 40 during arbor rotation.

The outside disc 32 is also provided with a pair of adjustable threaded tightening bolts 46 mounted in holes 48 and protruding from the inner surface of disc 32 toward the opposed inner surface of the inside disc 34. Bolts 46 have respective central axes parallel to the axis of rotation of arbor shaft 12 and are spaced radially therefrom. Bolts 46 preferably are equally spaced radially from the arbor axis and are diametrically opposed to provide rotational dynamic balance of fastener 31, but it should be appreciated that three bolts in an equilateral triangular configuration, or even more bolts arranged in a balanced distribution pattern, could also be used.

The corresponding holes 48 in disc 32 for receiving the bolts 46 preferably contain mating threads for engaging the threads of the bolts, thus allowing the bolts to be adjusted by turning bolt heads 50. Locking nuts 52 are provided to help maintain bolts 46 in their initially adjusted position during rotation of arbor 12. Alternatively, bolts 46 might be slidably fitted in the holes 48 of disc 32, with all adjustment then being performed by means of the locking nuts 52.

The inner face of the inside disc 34, i.e., the face opposite protruding bolts 46, contains respective bearing surface inserts 54 located thereon so as to correspond with the bolt ends 46. The inserts 54 are composed of a suitable metal such as peened brass and comprise a convenient, slightly depressed surface against which to tighten and seat bolts 46 so as to prevent their inadvertent slippage and scoring of disc 34.

The inner surface of disc 34 also contains a pair of depressions 56, circularly offset from bearing surfaces 54 but spaced to correspond with the respective positions of bolts 46 when disc 34 is rotated through a predetermined angle with respect to disc 32. Depressions 56 are sufficiently wide to permit the loose insertion of the locknuts 52 on the respective ends of the bolts 46 and are preferably of a depth deep or deeper than the maximum extent to which the bolts protrude from the inner surface of the outside disc 32 when the two discs are spread apart on the arbor shaft into their fastened position as shown in FIG. 3. When the discs are rotated relative to each other so that the depressions 56 are brought into alignment with bolts 46, as depicted in FIG. 4, the two discs 32 and 34 can be moved inward toward abutment with each other so that pin 42 may be either withdrawn from or inserted into the then-exposed hole 40 of shaft 12.

To initially assemble the saw blades and spacer assembly of the arbor, the individual elements of the spacer assembly 18, 22 and saw blades 20 are slipped onto the free end of arbor shaft 12 which has temporarily been removed from bearing 14 in the manner heretofore described. The final element of the spacer assembly, tubular sleeve 18, is followed onto the shaft by discs 34 and 32 in that order. In order to insert pin 42 into hole 40 of the shaft it is then necessary that the two discs be brought temporarily together, as shown in FIG. 4, to allow insertion. This is accomplished by rotating disc 34 with respect to disc 32 until depressions 56 are aligned with bolts 46. After pin 42 is inserted, disc 32 is retracted into engagement with pin 42 and rotationally oriented so that its grooves 44 lock the ends of pin 42 as shown in FIG. 3. The inside disc 34 is next rotated until its bearing surfaces 54 are brought into alignment with bolts 46. Thereafter bolts 46 are tightened against the bearing surfaces 54 by twisting bolt heads 50 until discs 32 and 34 are forcedly spread apart against the fixed pin 42 to apply the desired bearing pressure against tubular sleeve 18 of the arbor spacer assembly. Locknuts 52 are then tightened securely to seat bolts 46, and the free end of arbor shaft 12 is thereafter inserted in bearing 14 to complete the assembly.

To dismantle the blades and spacer assembly, bearing 14 is withdrawn, locknuts 52 are loosened, and bolts 46 are loosened sufficiently to relieve the pressure against the end of tubular sleeve 18 to permit the inside disc 34 to be rotated. Depressions 56 are brought into alignment with bolts 46, whereupon disc 32 can be slid toward abutment with disc 34, thereby allowing the withdrawal of pin 42. The discs, spacer assembly, and saw blades can then be slidably withdrawn from arbor shaft 12.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A fastener for securing the blades and spacer assembly of a saw arbor shaft against axial movement comprising:
   a. a fastener member slideably mounted on one end of said arbor shaft adjacent one end of said spacer assembly;
   b. retainer means axially secured to said arbor shaft and coupled with said fastener member for restraining said fastener member against axial movement in a direction away from said spacer assembly;
   c. adjustable tightening means mounted on said fastener member interposed axially between said fastener member and said end of said spacer assembly for forcedly holding said member and spacer assembly apart thereby exerting axial pressure between said retainer means and said spacer assembly; and
   d. a second fastener member slideably mounted on said arbor shaft axially between said first fastener member and said spacer assembly, said second member having an outer axial surface abutting one end of said spacer assembly and an inner axial surface facing and opposing said tightening means, said inner surface of said second fastener member having bearing surfaces spaced to align with said tightening means and depressions circularly offset from said bearing surfaces spaced to align with said tightening means and sized to accept the insertion of said tightening means so that, when said bearing surfaces are aligned with said tightening means, axial pressure may be exerted on said spacer assembly and, when said depressions are aligned with said tightening means, said fastener members can be slid axially closer together on said arbor for assembly or disassembly of said fastener.

2. The fastener of claim 1 wherein said retainer means comprises a pin having a length greater than the diameter of said arbor shaft inserted through a diametric hole in said arbor shaft.

3. The fastener of claim 2 wherein said pin is sized to fit loosely in said hole, and wherein said fastener member to which said pin is coupled has means for locking and holding the protruding ends of said pin to prevent its escape from said hole during rotation of said arbor.

4. The fastener of claim 1 wherein said second fastener member is rotatably mounted on said arbor shaft so that its bearing surfaces or, alternatively, its depressions may be brought into alignment with said tightening means by the rotation of said second fastener member on said arbor shaft with respect to said first fastener member.

5. The fastener of claim 1 wherein said inner surface of said second fastener member contains inserts of a material different from that of which said second fastener member is composed, said inserts comprising said bearing surfaces.

6. A fastener for securing the blades and spacer assembly of a saw arbor against axial movement comprising an arbor shaft with a retainer pin having a length greater than the diameter of said arbor shaft loosely inserted through a diametric hole in said arbor shaft and a tightening member mounted on said arbor shaft axially between said retainer pin and one end of said spacer assembly, said tightening member having adjusting means for axially expanding said tightening member into abutment both with said retainer pin and with said spacer assembly for exerting axial pressure therebetween, or alternatively for permitting the axial retraction of said tightening member to release said axial pressure, said retainer pin being removably secured to said arbor shaft to permit its removal following release of said axial pressure.

7. The fastener of claim 6 wherein said tightening member is slidably mounted on said arbor shaft to permit sliding of said tightening member axially off of said arbor shaft after removal of said retainer member.

8. A fastener for securing the blades and spacer assembly of a saw arbor shaft against axial movement comprising:
   a. inside and outside fastener discs slidably mounted side-by-side on one end of said arbor shaft, said inside disc having an outer axial surface abutting one end of said spacer assembly and said outside disc having an outer axial surface adjacent one end of said arbor shaft, each of said discs also having respective inner axial surfaces facing one another in opposed relationship;

b. a retainer pin axially secured to said arbor shaft and coupled with said outside disc for restraining said outside disc against axial movement in a direction away from said inside disc; and c. a pair of adjustable, diametrically opposed, threaded tightening bolts mounted on one of said discs and protruding from the inner axial surface thereof toward the inner axial surface of said other disc, said other disc having bearing surfaces spaced to align with and abut the protruding ends of said bolts to enable said bolts to hold said discs forcedly apart when aligned with said bearing surfaces so as to exert axial pressure between said retainer pin and said spacer assembly, said other disc also having depressions offset circularly from said bearing surfaces spaced and sized to align with and accept the insertion of the protruding ends of said bolts to enable said disc to be moved toward each other when said depressions are aligned with said bolts so as to facilitate assembly and disassembly of said fastener.

* * * * *